United States Patent [19]

Trost et al.

[11] Patent Number: 4,783,263

[45] Date of Patent: Nov. 8, 1988

[54] DETOXIFICATION PROCESS

[76] Inventors: Paul B. Trost, 664 Partridge Cir.; Robert S. Richard, 9025 Blue Mountain Dr., both of Golden, Colo. 80403

[21] Appl. No.: 875,338

[22] Filed: Jun. 17, 1986

[51] Int. Cl.⁴ .......................................... B01D 11/02
[52] U.S. Cl. ................... 210/638; 210/690; 210/704; 210/705; 210/908; 134/25.1
[58] Field of Search ............. 134/25.1; 210/638, 639, 210/690, 704, 705, 908–910

[56] References Cited

U.S. PATENT DOCUMENTS

| | | | |
|---|---|---|---|
| 3,635,789 | 1/1972 | Green | 209/4 |
| 3,670,883 | 6/1972 | Weir | 209/5 |
| 4,208,282 | 6/1980 | Becker | 210/705 |
| 4,376,708 | 3/1983 | Bellos | 210/705 |
| 4,377,473 | 3/1983 | Laros et al. | 210/705 X |
| 4,421,649 | 12/1983 | Giskehaug et al. | 210/909 X |
| 4,465,402 | 8/1984 | Meulen | 405/264 |
| 4,477,354 | 10/1984 | Fessler | 210/909 X |
| 4,549,966 | 10/1985 | Beall | 210/909 X |
| 4,595,509 | 6/1986 | Fox et al. | 210/909 X |
| 4,632,742 | 12/1986 | Tundo | 210/909 X |

Primary Examiner—Tom Wyse
Attorney, Agent, or Firm—Dorr, Carson Sloan & Peterson

[57] ABSTRACT

A process for removing toxic or hazardous substances from soils, sludges, sediments, clays, aqueous streams, and other non-hazardous materials comprises collecting the contaminated material, converting it to a slurry, adding one or more surfactants and/or alkaline agents to the slurry to free the toxic or hazardous substance(s) from the contaminated material and place it in the liquid phase of the slurry. Preferably, a modifier is added to the slurry in order to aid the concentration of the toxic substance in the liquid phase of the slurry. The concentrated toxic substance is then collected for disposal. Most preferably the concentration of the toxic substance is carried out in a froth flotation cell.

7 Claims, 2 Drawing Sheets

DETOXIFICATION PROCESS

BACKGROUND OF THE INVENTION

(1) Field of the Invention

The present invention generally relates to processes for removing toxic, hazardous or otherwise undesirable substances from soils, rock, clays, sediments, sludges and aqueous streams. It is particularly concerned with processes for removing toxic, organic substances from soils contaminated by industrial waste products.

(2) Description of the Prior Art

Until recent times, relatively little attention has been paid to the environmental consequences of dumping industrial wastes, whether in designated dump areas or elsewhere. However, as man's understanding of the health hazards associated with many previously dumped substances grows, the pressing need to clean up many contaminated areas has become more and more apparent. Such cleanup operations are, however, very costly as well as technically difficult. They often involve the transportation of large volumes of contaminated materials to specially designated and/or designed dump areas. This transportation of large volumes of contaminated materials, often over relatively long distances, is usually one of the most significant cost factors in cleanup operations of this kind. Moreover, equally large volumes of uncontaminated materials such as soils are often brought from distant locations to refill the cleanup site. At today's prices, the total direct and associated costs of many cleanup operations often exceed $400 per ton of contaminated material. Furthermore, the EPA has announced a five year goal of severely limiting and/or closing most hazardous waste landfills. Consequently, a number of alternatives to transportation intensive cleanup operations have been proposed.

Local incineration and in-situ cleanup processes are the most common alternative cleanup methods. However, the fuel costs of incineration are quite large. Incineration may also lead to air pollution problems which are sometimes even more pernicious than the original soil contamination problem being addressed. In-situ cleanup operations have another set of drawbacks associated with the fact that they usually involve injection of solvents for the contaminating substances and then extract the resulting solvent/contaminant solution by collection wells much in the way secondary and tertiary recovery techniques are carried out in oil field operations. Unfortunately, very large volumes of expensive solvents and/or water are required by such in-situ recovery operations. They present other potential problems as well. Sometimes solvents are lost in fissures in the earth. Such solvents can also, under injection well pressures, wander through various strata in the earth's surface and can themselves become contaminates in distant, previously uncontaminated areas. Solvent contaminant problems of this kind are often dealt with by isolating the contaminated area to be injected from uncontaminated adjacent areas. Walls and screens of one kind or another are usually employed for this purpose. However, the cost of constructing these barriers often becomes prohibitive. Moreover, many contaminated areas are simply missed by these in-situ techniques owing to discontinuities in and/or areas of impermeability of the soil in many contaminated areas.

SUMMARY OF THE INVENTION

According to the present invention, processes are provided for cleaning up materials such as soils, sludges (particularly oil refinery sludges), sediments, clays aqueous streams and other non-hazardous materials contaminated by toxic, hazardous or otherwise undesirable substances. These procedures are particularly well suited to cleaning up toxic or hazardous organic substances. These processes are easily scaled up or scaled down to meet the requirements of particular cleanup operations. The equipment needed to carry out these processes can be hauled to the site of the contamination. This of course means that much of the bulk material transportation costs otherwise associated with a given cleanup operation can be eliminated. The most essential elements of these processes are: collection of the contaminated material, conversion of the contaminated material into a slurry, addition of one or more surfactants and/or alkaline agents to place the undesired substance in the liquid phase of the slurry, and, optionally but most preferably, addition of a modifier to concentrate the undesired substance in the liquid phase and disposal of the concentrate. Most preferably the concentration step is carried out in a froth flotation cell. Obviously, the costs of transporting the resulting concentrate of the contaminant will be far less than the costs of transporting a bulk material such as contaminated soil. Various other optional, but preferred, processes can be added to the basic process to enhance its technical and economical performance.

The process begins with collection of the contaminated material, e.g., by excavation of a contaminated soil, dredging of a harbor, pumping of an oil sludge container. If need be, the contaminated material will then be subjected to various preparatory physical operations such as removal of foreign objects (e.g. trash, metals, tree limbs and roots), crushing, screening and the like. Preferably, a sized or otherwise physically uniform material is delivered to a tank where it is, if need be, scrubbed with water to break up any remaining lumps of material and generally to convert the contaminated material into a slurry. The tank will also be provided with means for placing mixing actions upon the materials to produce a slurry. Impellers are readily employed in such slurrying operations.

Local water sources can be employed for these slurrying operations; but in one higly preferred embodiment of this invention process water is reused as much as practicable. As hereinafter more fully described, process water can be obtained when a solid material is thickened at the end of a preferred embodiment of this process. In one particularly preferred embodiment of this invention, the water returned to the slurrying operation will have been subjected to a organic material stripping process such as those achieved by carbon absorption, ion exchange or reverse osmosis to remove any remaining organic materials in the liquid component of the froth flotation cell's discharge material. One or more surfactants and/or alkaline agents are added to the contaminated material. Anionic organic surfactants are highly preferred in the practice of this invention. The required mixing can be done prior to or during slurrying operations. The function of the surfactant(s) and/or alkaline agent(s) is to desorb or otherwise remove one or more absorbed contaminant(s) and place said contaminant(s) in the liquid phase of the slurry.

Again, these processes are particularly well suited for cleanup operations involving organic contaminants.

Selection of a particular surfactant or group of surfactants and/or a particular alkaline agent or group of alkaline agents capable of desorbing a particular contaminants or group of contaminants can vary a great deal. Examples of such selections could be as follows:

TABLE I

| | Surfactant or Alkaline Agent |
|---|---|
| Single Contaminants | |
| Creosote | Dodecylbenzen sulfonate |
| Polychorinated biphenols | Alphaolefin sulfonate |
| | Petrostep TM |
| | Fatty alcohols |
| | Sodium hydroxide, |
| | Calcium hydroxide, |
| | Sodium carbonate, |
| | Calcium oxide, |
| | Ammonium hydroxide and |
| | Sodium silicate. |
| Aldrin | Fatty alcohol ether sulfonates |
| Endrin | Dodecylbenzen sulfonate |
| Trifluralin | Alphaolefin sulfonate |
| Non-flurazon | Petrostep TM and |
| Atrazine | Fatty alcohols |
| | Sodium hydroxide, |
| | Calcium hydroxide, |
| | Sodium carbonate, |
| | Calcium oxide, |
| | ammonium hydroxide and |
| | Sodium silicate. |
| Complex Contaminants | |
| 1. Still bottoms from recovery of halogenated solvents, e.g., tetra chloroethylene, methylene chloride, trichloroethylene, chlorobenzene and others and still bottoms from non halogenated solvents, e.g., xylene, acetone, benzene, and MIBK. | Dodecylbenzen sulfonate Alphaolefin sulfonate Petrostep TM Fatty alcohols Sodium hydroxide, Calcium hydroxide, Sodium carbonate, Calcium oxide, Ammonium hydroxide and Sodium silicate. |
| 2. Wastewater treatment sludges from electroplating operations containing organic pollutants as defined in 40 CFR 261.33. | Dodecylbenzen sulfonate Alphaolefin sulfonate Petrostep TM Fatty alcohols Sodium hydroxide, Calcium hydroxide, Sodium carbonate, Calcium oxide, Ammonium hydroxide and Sodium silicate. |
| 3. Sludges from refinery operations and API separators containing EPA identified hazardous wastes as defined in 40 CFR 261.33 including but not limited to volatile organic compounds, halogenated organic compounds, polynuclear aromatic compounds. | Fatty alcohols Sodium hydroxide, Calcium hydroxide, Sodium carbonate, Calcium oxide, ammonium hydroxide and Sodium silicate. |
| 4. Sediments from lagoons, harbor bottoms, and impoundments containing volatile organic compounds, e.g., trichloroethylene, chlorobenzene, halogenated organic compounds, e.g., PCB, polynuclear halogenated aromatic compounds, pasticidal herbicides and other organic pollutants as defined in 40 CFR 261.33. | Dodecylbenzen sulfonate Alphaolefin sulfonate Petrostep TM |
| 5. Soils from manufacturing plant areas, loading areas, storage areas contaminated with volatile organic | Dodecylbenzen sulfonate Alphaolefin sulfonate Petrostep TM Fatty alcohols |

TABLE I-continued

| | Surfactant or Alkaline Agent |
|---|---|
| compounds, halogenated organic compounds, polynuclear aromatic compounds, pesticides, herbicides, as defined in 40 CFR 261.33. | Sodium hydroxide, Calcium hydroxide, Sodium carbonate, Calcium oxide, ammonium hydroxide and Sodium silicate. |

Specific Contaminated Site Materials

Soil containing creosate and penta chlorophenol in concentrations up to 10.0% taken from railroad tie storage site.

Soil and sediments from Basin F. Rocky Mountain Aresenal, Denver, Colo. containing phenol, chlorophenol, pentachlorophenol, flororene, napthalene, anthracene, phenanthrene aldrin, isodrin, dieldrin, endrin, diisopropylmethyl phosphonate, dimethyphosphonate, p-chlorophenyl-methylsulfore.

Benton Harbor, MA, sediments and sludges containing polychorinated biphenols.

Road gravels, Kenai Penninsula, Alaska site containing polychlorinated biphenols in crude oil.

API sludges and still bottoms from refinery, Port Arthur, TX, containing anthracene, phenanthrene, volatile organic compounds, benzene, toulene xylene, phenols, pyridia, hydrazine, tetraethyl lead.

Soils from chemical plant manufacturing areas containing toxic and hazardous materials, e.g., styrene tars and demethyl phthalates, formaldehyde, dibutyl phthalate, in soils at the Brio site, TX.

By way of example only, this process was tested for its ability to concentrate creosote (a coal-tar distillation product which normally contains substantial amounts of naphthalene and anthracene) from a contaminated soil. A feed containing about 1.61 percent by weight of creosote was conditioned and introduced into a froth flotation cell. Stephanflo TM was used as the surfactant. After 25 minutes of froth flotation cell action, the resultant froth and tailing materials were analyzed. The creosote concentration of the froth was 28.4 percent by weight while the creosote concentration of the tailing was less than 0.1 percent by weight.

By way of further example, the following tests were conducted and the following results were obtained;

| Basin F. Sed. Cleanup | | |
|---|---|---|
| Major Toxic Components | Aldrin | |
| | Dieldrin | |
| | Endrin | |
| | Dilhiar | |
| | Disapropylmethyl phosphorate | |
| | Dimethylmethyl phosphorate | |
| | p-chlorophenyl methylsulforide | |
| | p-chlorophenylmethylsulfore | |
| | Weight Dist % | Orig. Dist. % |
| Feed | 100 | 100 |
| Froth | 4.0 | 99+ |
| Tail | 96.0 | <1 |
| Used 0.1 lb/ton Sunlight dishwashing detergent dodecylbenzene sulfonate. | | |

| API Sludge | | | |
|---|---|---|---|
| | Weight Dist % | % Orig. | Dist. Orig |
| Feed | 100 | 27 | |
| Oil | 10 | 100 | 50 |
| Froth | 30 | | 50 |

| | | -continued | |
|---|---|---|---|
| Tail | 60 | <0.5 | <1 |

Used 50 lb/ton sodium meta silicate 1 lb/ton anionic surfactant.

The surfactants and alkaline agents used in these processes generally represent from about 0.01 to 5.0 percent by weight of the contaminated material. Again, the introduction of these surfactants and/or alkaline agents is carried out as part of the slurrying operation. Again, anionic surfactants are highly preferred Thereafter the slurry is exposed to the action of a froth flotation cell. The slurrying action could be initially carried out in the froth flotation cell itself. However in a more preferred embodiment of this invention the slurrying action will take place in a separate mixing or scrubbing tank and the resulting slurry transferred to the froth flotation cell.

The slurry produced in such a tank is then transferred by gravity or pumping to the froth flotation cell. Many surfactants and alkaline agents or combination of surfactants and alkaline such as those given as examples in TABLE I are capable of producing the frothing action needed in a froth flotation cell. However, in a preferred embodiment of this invention, the slurry is exposed to one or more agents or "modifiers" capable of enhancing the collection and/or concentration of the undesirable substance(s) which have been desorbed from the contaminated material and placed in the liquid phase of the resulting slurry material produced after the surfactant has been added.

Most preferably, the exposure of the resulting slurry material to the action of the modifier capable of collecting and/or concentrating the contaminant will take place in the flotation cell rather than in the container in which the slurrying operation is first carried out. Most preferably, the cell will preferably be capable of carrying out both froth flotation cell and counter current decantation operations in a manner hereinafter more fully described. Preferably the modifier is added to the resulting slurry after it reaches the froth flotation cell or counter current decantation equipment. In the simplest version of this process, the resulting slurry is delivered to a single froth flotation cell. Here it can be further exposed to the action of the modifier and/or any optional chemical agents which serve to promote the froth flotation process. In any case, the modifier collects and concentrates the contaminant which is dissolved in the surfactant and/or alkaline agent as the contaminant rises in the flotation cell. The concentrated substance which rises in the cell is skimmed off the flotation cell in ways known to the art. It is then disposed of in some approved manner. The remaining solid materials/liquid (water, and any remaining surfactants, alkaline agents, modifiers, etc.) can then be transferred to a material thickener means capable of separating the remaining material into its solid component and its liquid component.

The agents or modifiers capable of concentrating the contaminant, or conversely, capable of reducing the bulk solution concentration, can also be selected along rather broad guidelines. As general rule, however, surfactant selection will normally follow considerations usually associated with Traube's Rule: a polar (non-polar) absorbent will preferentially absorb the more polar (non-polar) component of a non-polar (polar) solution. Non-toxic modifiers are preferred, and non-toxic liquid organic modifiers such as kerosene, alcohols, dichloromethane, are even more preferred. The modifier must be capable of concentrating the toxic or hazardous material from the solution. Representative modifiers for concentrating representative contaminant are found in Table II. Modifiers in concentrations of from about 0.5 to about 10 percent by weight of the contaminated material are preferred.

TABLE II

| Modifier | Contaminant |
|---|---|
| Kerosene | Heavy Oils, e.g., |
|  | Antracene |
|  | Phenanthrene |
| Ethanol | TNT |
|  | DNT |
|  | Aldrin |
|  | Endrin |
| Mineral Oil | And other |
|  | Pesticides |
| Dichloromethane | Aldrin |
| Petroleum Ether | Endrin |
|  | Plendrin and |
|  | Other pesticides |

Various optional ingredients can be used to further aid the froth flotation cell action. For example, phosphates, carbonates and silicates are well suited to this purpose. They can be used in concentrations of from about 0.5 to about 10 percent by weight of the slurry material. Various other optional, but preferred process flow steps, hereinafter more fully described in conjunction with FIG. 2 also can be employed to supplement the basic process of this invention.

For example, a series of forth flotation cells can be employed. Each cell can be supplied by its own modifier and/or optional ingredient source or the modifier(s) and optional ingredient(s) can be transferred from one cell to another. The counter current flow of modifier depicted in FIG. 2 is particularly suited to gaining maximum utilization of the modifier(s) optional ingredient(s) employed. This invention also contemplates the introduction of one modifier or optional ingredient in one froth flotation cell and another different modifier in another froth flotation cell. A series of cell units can be employed to optimize the froth flotation cell action. Other variations in the process are also contemplated. For example, a first modifier may concentrate a first contaminant and a second modifier may concentrate a second contaminant. The second modifier may however also be used to recover any of first contaminant not recovered by the first modifier. In a similar vane the concentrations of the first, second, third, etc. modifiers may be varied along the froth flotation cell series. Moreover the contaminant may be collected from each individual cell or the contaminant may be concentrated into one cell and collected from that particular cell.

In any case, the remaining material product from the last cell will preferably be sent to a thickener before it is returned to site. Here the material will be concentrated and returned to site. A belt filter system can be employed for this purpose but other systems known to the art may also be employed. Their filtrate products can be returned to process. In a preferred embodiment of this invention, the liquid may be stripped of any remaining organic components before the water component is returned to process. This stripping function can be carried out by ion exchange, reverse osmosis and/or absorption on carbon resins or in other ways well known to this art. As previously noted the water component is most conveniently returned to the point in the process where the initial slurrying operations are conducted. Additional water can be added to the process as needed.

BRIEF DESCRIPTION OF THE DRAWINGS

The objects and advantages of this invention will be further detailed in the following description of the preferred embodiments of these processes, particularly when taken in conjunction with the accompanying drawings, which represent an integral part of this patent disclosure and wherein.

DESCRIPTION OF THE PREFERRED EMBODIMENTS

Figure 1:
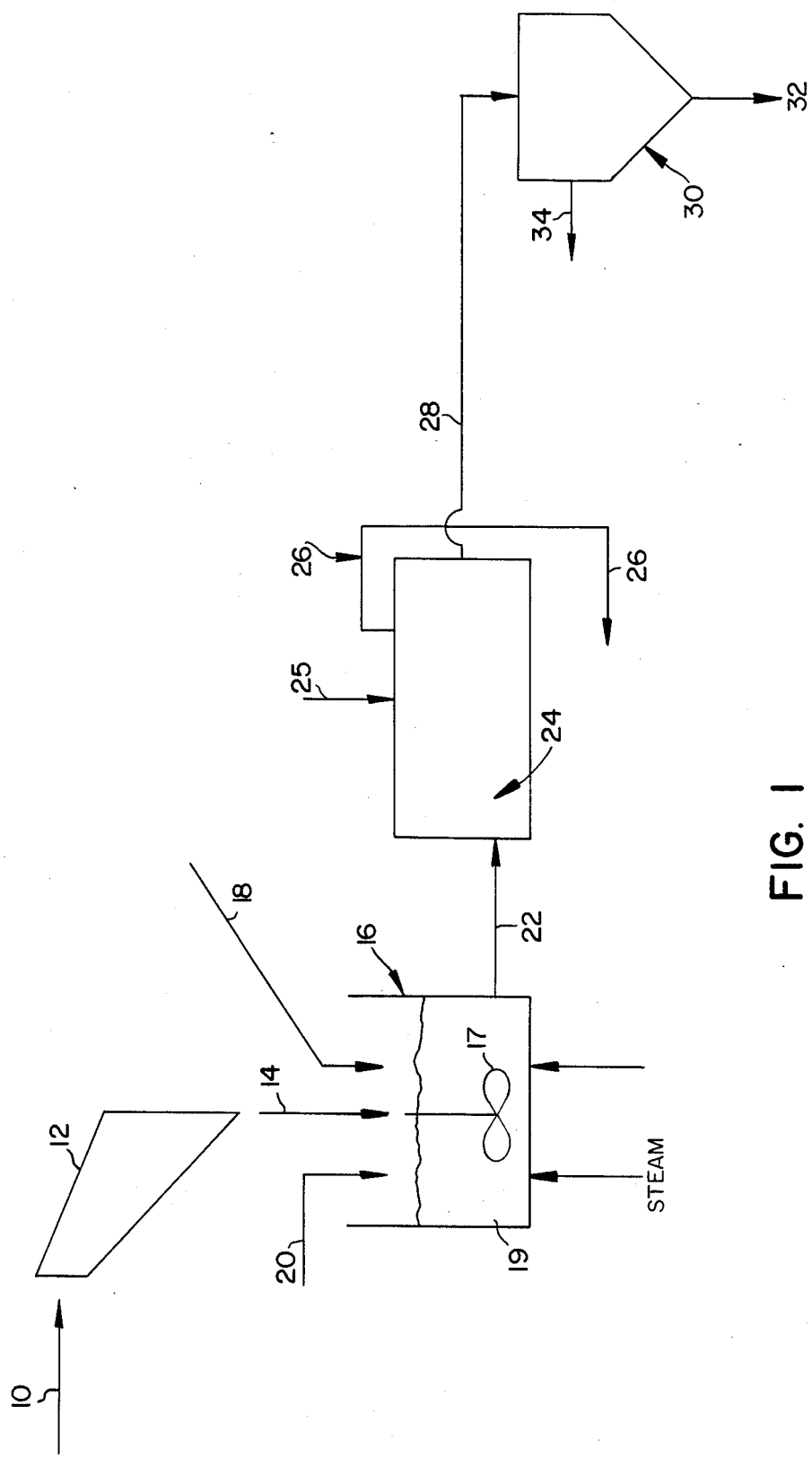
FIG. 1 represents a highly generalized flow diagram of the process.

FIG. 1 represents a highly generalized version of the process of this invention wherein a feedstock material such as a soil sludge, sediment, clay, crushed rock or water stream 10 contaminated by a toxic, hazardous or otherwise undesirable substance undergoes one or more initial physical, material handling processes steps known to the art such as, for example, trash and tree limb removal, crushing and screening operations etc. A screen 12 is shown to generally depict such initial physical, material handling operations. Such operations are of course optional to the process of this patent disclosure. Some contaminated materials may not need such process steps. In any case, the contaminated soil 14 is then delivered to a container such as a conditioner tank 16 having stirring means 17. The tank 16 receives a liquid stream 18 such as water with which to make a contaminated soil/liquid slurry 19 under the action of means 17 for producing shear forces within the slurry or for producing a mixing and/or blending action. Such actions will depend on the nature of the contaminant and the soil contaminated material. An agent capable of desorbing the hazardous substance from the soil 20 and placing it in the liquid phase is also mixed in with the contaminated soil/liquid slurry 19. Again the agents for desorbing an undesired substance from the soils 10 can be surfactants and/or alkaline agents. For example, if the undesired substance were oil, the agent 20 could be an olefin sulfonate since olefin sulfonates act as surfactants to the oil and are capable of placing the oil in the liquid phase of the slurry. In any case, the resulting material 22 then may be exposed to the action of an agent or modifier capable of collecting and/or concentrating the undesirable substance(s) which have been desorbed from the soil and place them in the liquid phase of the resulting slurry material 22.

Most preferably the exposure of the resulting materials to the collecting and/or concentrating agent will take place in a container other than tank 16. A froth flotation cell 24 is the highly preferred means for carrying out this exposure. Preferably, the collecting and concentrating agent 25 will be introduced into the process via cell 24 rather than at other points in the overall process. The concentrated undesirable substance 26 produced by the cell is then skimmed off the cell and disposed of in some approved manner. The remaining soil/liquid mixture 28 is then transferred to a soil thickener means 30 capable of separating the mixture 28 into its soil component 32 and its liquid component 34.

Figure 2:
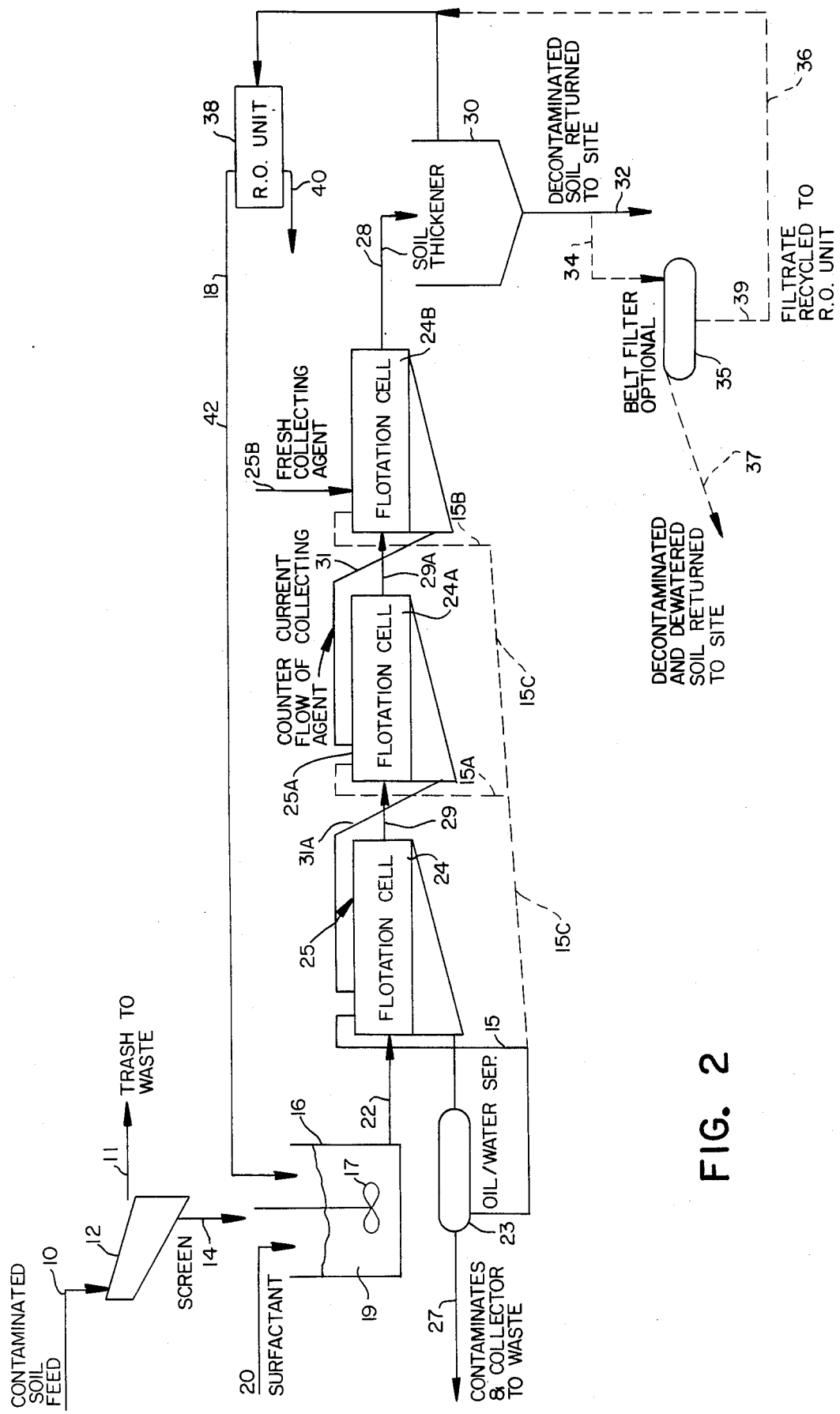
FIG. 2 represents a more specific flow diagram of the process showing optional but preferred features and additions to the more generalized process depicted in FIG. 1.

FIG. 2 depicts a preferred embodiment of this process wherein various optional, but preferred process steps are used to augment the more basic version of the process depicted in FIG. 1. In this more preferred version of the process a feed stock such as soil, sludge, clay, sediment, crushed rock etc. contaminated by one or more toxic organic substances is delivered to a material handling process unit such as a screen 12. Trash and other foreign objects and materials 11 are separated and removed. The contaminated soil component 14 is then sent to tank 16 and mixed with a controlled stream of water 18 and a controlled stream of non toxic surfactant(s) and/or alkaline agent(s) to the toxic organic substances under the action of a stirring means 17 capable of producing a contaminated soil/water/surfactant slurry 19. The surfactant(s) and/or alkaline agent(s) will desorb the toxic organic substance(s) from the soil and place the toxic organic substances in the liquid phase of the slurry 19. Thereafter, the resulting slurry 22 will be transferred to a first flotation cell 24 of a series of flotation cells 24, 24A, 24B, etc., wherein the resulting slurry 22 will be exposed to the action of one or more modifier(s) 25 capable of desorbing the toxic organic substances from the resulting slurry 22. Various modifiers 25, 25A, 25B, as well as various optional ingredients such as phosphates, carbonates and silicates, can be introduced in various cells 24, 24A, 24B, etc. in the flotation cell series. It is also contemplated that one modifier, e.g., 25 can be introduced into one cell, e.g., 24, in order to concentrate one toxic organic substance and another modifier, e.g., 25B, can be introduced into another cell, e.g., 24B, to concentrate another toxic organic substance. The respective concentrated toxic substances and modifier products 15, 15A, 15B of each individual cell 24, 24A, 24B etc. can be individually collected and sent to waste disposal means 27, preferably via an oil/water separator means 23 as indicated by dotted lines 15, 15A, 15B, 15C. However FIG. 2 also illustrates a preferred embodiment of this invention wherein the flotation is carried out in stages with the modifier flowing counter current to the soil. Such counter current operation promotes maximum utilization of the modifier. For example, concentrated toxic substance/modifier products 31 and 31A of cells 24B and 24A respectively are returned, in counter current flow, or in normal flow, to upstream froth flotation cells 24A and 24B respectively.

FIG. 2 also illustrates some optional, but preferred additions to the process downstream from the last forth flotation cell 24B. For example, product 28 of froth flotation cell 24B is shown being delivered to a soil thickener 30. The effluent 32 of soil thickener 30 can be collected and directly returned to the site from which it was originally taken. However, in a preferred optional embodiment of this process, the effluent 32 of soil thickener 30 is deliquified, preferably by a belt filter system 35. The decontaminated and deliquified product 37 of belt filter 35 is then returned to site; the filtrate 39 is sent to a means for stripping any remaining organic components from the water component of the filtrate. Preferably the means for stripping the organic components from the water component is a reverse osmosis, carbon absorption, and/or ion exchange unit 38. Their organic effluent 10 is disposed of and their water effluent 18 is returned to process, preferably at tank 16. Those skilled in this art will appreciate that the above tables, examples and illustrations are but examples of various embodiments of this invention, and consequently should not be regarded as limitations on its broader teachings.

Thus having disclosed our invention, we claim:

1. A process for cleaning up a solid material contaminated by an undesirable substance, said process comprising:
   collecting the contaminated material;
   converting the contaminated solid material to a slurry;
   adding a first agent to desorb the undesirable substance from the solid material and place it in the liquid phase of the slurry;
   exposing the resultant slurry to the action of a froth floatation cell; and
   disposing of the resulting concentrate of the undesirable substance.

2. A process for detoxifying a solid material contaminated by a toxic substance, said process comprising:
   collecting the contaminated material;
   converting the contaminated material to a contaminated solid material/water slurry;
   adding a surfactant to desorb the toxic substance from the solid material and place it in the liquid phase of the slurry;
   adding a second agent to the slurry in a froth floatation cell to concentrate the toxic substance in the froth; and
   disposing of the concentrate of the toxic substance produced by the froth floatation cell.

3. A process for detoxifying a solid material contaminated by a toxic substance, said process comprising:
   collecting the contaminated solid material;
   converting the contaminated solid material to a contaminated solid material/water slurry;
   adding an alkaline agent to desorb the toxic substance(s) from the solid material and place it in the liquid phase of the slurry;
   adding a second agent to the slurry in a froth floatation cell to concentrate the toxic substance; and
   disposing of the concentrate of the toxic substance produced by the froth floatation cell.

4. A process for detoxifying a soil contaminated by a toxic substance, said process comprising:
   collecting the contaminated soil;
   converting the contaminated soil to a contaminated soil/water slurry;
   adding a first agent to desorb the toxic substance from the soil and place it in the liquid phase of the slurry;
   adding a second agent to the slurry in a counter current flow decantation to concentrate the toxic substance; and
   disposing of the concentrate of the toxic substance produced by the counter current decantation.

5. A process for detoxifying a soil contaminated by at least one organic toxic substance, said process comprising the sequential steps of:
   collecting the contaminated soil;
   screening the contaminated soil;
   converting the contaminated soil to a contaminated soil/water slurry with at least a portion of water recycled from the process;
   adding at least one non-toxic anionic surfactant to desorb at least one organic toxic substance from the soil and place it in the liquid phase of the slurry;
   transferring the slurry to at least one froth flotation cell;
   adding at least one modifier to the slurry in at least one froth flotation cell to concentrate the toxic substance in the froth flotation cell; and
   disposing of the concentrate of the toxic substance produced by the froth flotation cell.

6. A process for detoxifying a soil contaminated by at least one organic toxic substance, said process comprising the sequential steps of:
   collecting the contaminated soil;
   screening the contaminated soil;
   transferring the contaminated soil to a scrubbing tank;
   converting the contaminated soil into a contaminated soil/water slurry with at least a portion of water recycled from a soil thickening step of the process, with said conversion to the slurry being carried out in the presence of at least one non-toxic, anionic surfactant selected from the group consisting of doceylbenzene-sulfonate, and olefin sulfonates to desorb at least one organic toxic substance from the soil and place it in the liquid phase of the slurry;
   transferring the slurry through a series of froth flotation cells wherein at least one modifier selected from the group consisting of kerosene, ethanol, methanol, petroleum ether, dichloromethane, and mineral oil is added to at least one of the froth flotation cells and wherein at least one of the froth flotation cells is subject to a counter current flow of the modifier to concentrate the toxic substance in at least one of the froth flotation cells;
   transferring decontaminated soil and liquid from the last in the series of flotation cells to a means for separating the decontaminated soil from the liquid;
   transferring the liquid to a means for separating it into its water component and its remaining organic component;
   transferring at least a portion of the water component back to process;
   transferring at least a portion of the remaining organic component to process; and
   transferring the decontaminated soil to a means for transporting said soil back to its original site.

7. A process for detoxifying a soil contaminated by at least one organic toxic substance, said process comprising the sequential steps of:
   collecting the contaminated soil;
   screening the contaminated soil;
   crushing the contaminated soil;
   transferring the contaminated soil to a scrubbing tank;
   converting the contaminated soil into a contaminated soil/water slurry with at least a portion of water recycled from a soil thickening step of the process, with said conversion to the slurry being carried out in the presence of from about 0.01 to about 5.0 percent by weight of at least one non-toxic, anionic surfactant selected from the group consisting of doceylbenzene-sulfonate, olefin sulfonates, fatty alcohols and fatty alcohol ether sulfonates to desorb at least one organic toxic substance from the soil and place it in the liquid phase of the slurry;
   transferring the slurry through a series of froth flotation cells wherein from about 0.5 to about 10 percent by weight of a modifier selected from the group consisting of kerosene, ethanol, methanol, petroleum ether, dichloromethane, and mineral oil, is added to at least one of the froth flotation cells and wherein at least one of the froth flotation cells is subject to a counter current flow of the modifier to concentrate the toxic substance in at least one of the froth flotation cells;

disposing of the concentrate of at least one toxic substance produced by at least one of the froth flotation cells;

transferring decontaminated soil and liquid from the last in the series of flotation cells to a means for separating the decontaminated soil from the liquid;

transferring the liquid to a stripping means for separating it into its water component and its remaining organic component;

transferring at least a portion of the water component back to process;

transferring at least a portion of the remaining organic component to process; and transferring the decontaminated soil to a means for transporting said soil back to its original site.

* * * * *

UNITED STATES PATENT AND TRADEMARK OFFICE
CERTIFICATE OF CORRECTION

PATENT NO. : 4,783,263                 Page 1 of 4
DATED : November 3, 1988
INVENTOR(S) : Trost et al It is certified that error appears in the above-identified patent and that said Letters Patent is hereby corrected as shown below:

In the [76] inventors section of page 1 of the patent, line 2, delete "Richard" and insert -- Rickard --.

In the specification
    Column 2, line 56, after "been subjected to" delete "a" and insert -- an --.
    Column 2, line 58, before "ion exchange" delete "absorption," and insert -- adsorption, --.
    Column 2, line 67, after "one or more" delete "absorbed" and insert -- adsorbed --.
    Column 3, line 5, after "a particular" delete "contaminants" and insert -- contaminant --.
    Column 3, line 6, after "a particular" delete "contaminants" and insert -- contaminant --.
    Column 3, line 13, delete "Dodecylbenzen" and insert -- Dodecylbenzene --.
    Column 3, line 14, before "biphenols" delete "Polychorinated" and insert -- Polychlorinated --.
    Column 3, line 22, delete "Dodecylbenzen" and insert -- Dodecylbenzene --.
    Column 3, line 32, before "sulfonate" delete "Dodecylbenzen" and insert -- Dodecylbenzene --.
    Column 3, line 40, before "sulfonate" delete "Dodecylbenzen" and insert -- Dodecylbenzene --.
    Column 3, line 56, before "sulfonate" delete "Dodecylbenzen" and insert -- Dodecylbenzene --.
    Column 3, line 63, before "herbicides and" delete "pasticidal" and insert -- pesticidal --.
    Column 3, line 66, before "sulfonate" delete "Dodecylbenzen" and insert -- Dodecylbenzene --.

UNITED STATES PATENT AND TRADEMARK OFFICE
CERTIFICATE OF CORRECTION

PATENT NO. : 4,783,263                          Page 2 of 4

DATED : November 8, 1988

INVENTOR(S) : Trost et al

It is certified that error appears in the above—identified patent and that said Letters Patent hereby corrected as shown below:

Column 4, line 13, delete "creosate" and insert -- creosote --.
    Column 4, line 13, delete "penta chlorophenol" and insert -- pentachlorophenol --.
    Column 4, line 16, after "Basin F" delete the period.
    Column 4, line 17, delete "Aresenal," and insert -- Arsenal, --.
    Column 4, line 18, delete "flororene," and insert -- fluorene --.
    Column 4, line 20, after "phosphonate," delete "dimethyphosphonate" and insert -- dimethylphosphonate --.
    Column 4, line 21, after "p-chlorophenyl-" delete "methylsulfore" and insert -- methylsulfone --.
    Column 4, line 23, before "biphenols" delete "polychorinated" and insert -- polychlorinated --.
    Column 4, line 28, after "benzene," delete "toulene" and insert -- toluene --.
    Column 4, line 40, delete "Stephanflo" and insert -- Stepanflo --.
    Column 4, line 50, after "Basin F" delete the period.
    Column 4, line 55, delete "phosphorate" and insert -- phosphonate --.
    Column 4, line 56, delete "phosphorate" and insert -- phosphonate --.
    Column 4, line 58, delete "p-chlorophenylmethylsulfore" and insert -- p-chlorophenylmethylsulfone --.
    Column 5, line 12, after "highly preferred" insert a period.
    Column 5, line 63, before "general rule" insert -- a --.

UNITED STATES PATENT AND TRADEMARK OFFICE
CERTIFICATE OF CORRECTION

PATENT NO. : 4,783,263  
DATED : November 8, 1988  
INVENTOR(S) : Trost et al

It is certified that error appears in the above-identified patent and that said Letters Patent hereby corrected as shown below:

Column 5, line 66, before "will preferentially" delete "absorbent" and insert -- adsorbent --.

Column 5, line 66, after "will preferentially" delete "absorb" and insert -- adsorb --.

Column 6, line 5, delete "contaminant" and insert -- contaminants --.

Column 6, line 12, below "Heavy oils, e.g.," delete "Antracene" and insert -- Anthracene --.

Column 6, line 33, after "series of" delete "forth" and insert -- froth --.

Column 6, line 66, after "and/or" delete "absorption" and insert -- adsorption --.

Column 6, line 67, after "and/or" delete "absorption" and insert -- adsorption --.

Column 8, line 50, after "from the last" delete "forth" and insert -- froth --.

Column 8, line 64, delete "absorption" and insert -- adsorption --.

In the claims

Claim 1, line 11, before "cell" delete "floatation" and insert -- flotation --.

Claim 2, line 9, after "in a froth" delete "floatation" and insert -- flotation --.

Claim 2, line 13, after "by the froth" delete "floation" and insert -- flotation --.

Claim 3, line 9, after "in a froth" delete "floatation" and insert -- flotation --.

Claim 3, line 12, after "by a froth" delete "floatation" and insert -- flotation --.

UNITED STATES PATENT AND TRADEMARK OFFICE
CERTIFICATE OF CORRECTION

PATENT NO.   :   4,783,263
DATED        :   November 8, 1988
INVENTOR(S)  :   Trost et al It is certified that error appears in the above-identified patent and that said Letters Patent hereby corrected as shown below:

In the drawings
    Figure 2, just below line 27, delete "contaminates" and insert -- contaminants --.

Signed and Sealed this

Twenty-seventh Day of November, 1990

Attest:

HARRY F. MANBECK, JR.

*Attesting Officer*     *Commissioner of Patents and Trademarks*